US012457344B2

(12) United States Patent
Randell et al.

(10) Patent No.: US 12,457,344 B2
(45) Date of Patent: Oct. 28, 2025

(54) ADVANCED VIDEO CODING USING A KEY-FRAME LIBRARY

(71) Applicant: Google LLC, Mountain View, CA (US)

(72) Inventors: Jerrold Richard Randell, Waterloo (CA); Stuart James Myron Nicholson, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 147 days.

(21) Appl. No.: 17/996,281

(22) PCT Filed: Apr. 9, 2021

(86) PCT No.: PCT/US2021/070375
§ 371 (c)(1),
(2) Date: Oct. 14, 2022

(87) PCT Pub. No.: WO2022/216334
PCT Pub. Date: Oct. 13, 2022

(65) Prior Publication Data
US 2023/0224476 A1 Jul. 13, 2023

(51) Int. Cl.
*H04N 19/159* (2014.01)
*G06T 5/40* (2006.01)
(Continued)

(52) U.S. Cl.
CPC ............. *H04N 19/159* (2014.11); *G06T 5/40* (2013.01); *G06V 10/761* (2022.01); (Continued)

(58) Field of Classification Search
None
See application file for complete search history.

(56) References Cited

U.S. PATENT DOCUMENTS 5,923,376 A * 7/1999 Pullen .................... H04N 19/96 375/E7.176
6,169,821 B1 1/2001 Fukunaga et al.
(Continued)

FOREIGN PATENT DOCUMENTS

CN 103299644 A 9/2013
CN 103430538 A 12/2013
(Continued)

OTHER PUBLICATIONS

International Search Report and Written Opinion for PCT Application No. PCT/US2021/070375, mailed on Dec. 13, 2021, 14 pages.
(Continued)

*Primary Examiner* — Mohammad J Rahman
(74) *Attorney, Agent, or Firm* — Brake Hughes Bellermann LLP

(57) ABSTRACT

A method including generating at least one of a key frame and an inter-predicted frame based on a received video stream including at least one video frame, the inter-predicted frame being generated using information from the key frame, determining whether the key frame is stored at a receiving device, selecting video data as one of the key frame or a key frame identifier representing the key frame based on whether the key frame is stored at the receiving device, and communicating at least one of the video data and the inter-predicted frame.

20 Claims, 9 Drawing Sheets

(51) Int. Cl.
*G06V 10/74* (2022.01)
*G06V 10/764* (2022.01)
*H04N 19/172* (2014.01)

(52) U.S. Cl.
CPC ......... *G06V 10/764* (2022.01); *H04N 19/172* (2014.11); *G06T 2207/10024* (2013.01)

(56) References Cited

U.S. PATENT DOCUMENTS

| | | | | |
|---|---|---|---|---|
| 9,854,269 | B2 * | 12/2017 | Heo | H04N 13/161 |
| 11,651,592 | B2 * | 5/2023 | Joo | G06V 20/58<br>382/103 |
| 2006/0031915 | A1 * | 2/2006 | Winder | H04N 21/4347<br>375/E7.199 |
| 2006/0117357 | A1 | 6/2006 | Surline | |
| 2008/0165847 | A1 | 7/2008 | Kim | |
| 2011/0265134 | A1 | 10/2011 | Jaggi et al. | |
| 2012/0008686 | A1 * | 1/2012 | Haskell | H04N 19/46<br>375/E7.123 |
| 2012/0008687 | A1 * | 1/2012 | Haskell | H04N 19/117<br>375/E7.115 |
| 2012/0082217 | A1 * | 4/2012 | Haskell | H04N 19/176<br>375/E7.243 |
| 2012/0087583 | A1 | 4/2012 | Yang et al. | |
| 2012/0170654 | A1 | 7/2012 | Zhang et al. | |
| 2013/0294743 | A1 | 11/2013 | Thornberry | |
| 2013/0343460 | A1 * | 12/2013 | Itani | H04N 19/48<br>375/240.16 |
| 2015/0215624 | A1 | 7/2015 | Wei | |
| 2016/0360235 | A1 * | 12/2016 | Ramasubramonian | H04N 19/587 |
| 2017/0054988 | A1 * | 2/2017 | Lin | H04N 19/105 |
| 2018/0077421 | A1 | 3/2018 | Sablin et al. | |
| 2018/0167631 | A1 | 6/2018 | Schulze et al. | |
| 2018/0343098 | A1 | 11/2018 | Goel et al. | |
| 2020/0164509 | A1 | 5/2020 | Shults et al. | |
| 2020/0357444 | A1 | 11/2020 | Qin et al. | |
| 2021/0281874 | A1 * | 9/2021 | Lasserre | H03M 7/3071 |
| 2023/0063062 | A1 * | 3/2023 | Srinivasan | H04N 19/12 |

FOREIGN PATENT DOCUMENTS

| | | | |
|---|---|---|---|
| CN | 107960125 | A | 4/2018 |
| CN | 110024409 | A | 7/2019 |
| JP | H07203294 | A | 8/1995 |
| JP | 2010258576 | A | 11/2010 |
| JP | 2016506139 | A | 2/2016 |
| JP | 2018142752 | A | 9/2018 |

OTHER PUBLICATIONS

Zuo, et al., "Scene-Library-Based Video Coding Scheme Exploiting Long-Term Temporal Correlation", Journal of Electronic Imaging, vol. 26(4), Jul./Aug. 2017, 13 pages.
First Office Action for CN Application No. 202180006692.9 (with English Translation), mailed Jul. 6, 2023, 35 pages.
Notice of Allowance (with English translation) for Chinese Application No. 202180006692.9, mailed Jun. 17, 2024, 6 pages.
Zhang, "Research on High Efficiency Inter Coding in Video Compression", Dissertation for the Doctoral Degree in Engineering, Harbin Institute of Technology, Jan. 2017, 157 pages.
Office Action for Japanese Application No. 2023-546330 (with English translation), mailed Dec. 24, 2024, 14 pages.
Decision of Rejection for Japanese Application No. 2023-546330 (with English translation), mailed May 20, 2025, 9 pages.

* cited by examiner

ADVANCED VIDEO CODING USING A KEY-FRAME LIBRARY

CROSS-REFERENCE TO RELATED APPLICATION

This application is a 35 U.S.C. § 371 National Phase Entry Application from PCT/US/2021/070375, filed on Apr. 9, 2021, entitled "ADVANCED VIDEO CODING USING A KEY-FRAME LIBRARY", the disclosure of which is incorporated herein by reference in its entirety.

FIELD

Embodiments relate to compressing and decompressing video.

BACKGROUND

An encoder can be used to compress video (e.g., video frames) and/or images. A compressed video frame and/or image has a reduced number of bits as compared to the original image or frame. A decoder can be used to decompress the compressed frame and/or image to reconstruct the original video frame and/or image. Some encoders can use an encoder/decoder standard (e.g., AVC, H.264, MPEG-4, and/or the like).

SUMMARY

In a general aspect, a device, a system, a non-transitory computer-readable medium (having stored thereon computer executable program code which can be executed on a computer system), and/or a method can perform a process with a method including generating at least one of a key frame and an inter-predicted frame based on a received video stream including at least one video frame, the inter-predicted frame being generated using information from the key frame, determining whether the key frame is stored at a receiving device, selecting video data as one of the key frame or a key frame identifier representing the key frame based on whether the key frame is stored at the receiving device, and communicating at least one of the video data and the inter-predicted frame.

In a general aspect, a streaming device includes a controller configured to determine whether a key frame is stored at a receiving device, a selection circuit configured to select video data as one of the key frame or a key frame identifier representing the key frame based on determining whether the key frame is stored at the receiving device, and a transmitter configured to communicate at least one of the video data and an inter-predicted frame.

In a general aspect an encoder includes a compressed frame generator configured to generate at least one of a key frame and an inter-predicted frame based on a received video stream including at least one frame, the inter-predicted frame being generated using information from the key frame, a controller configured to determine whether the key frame is stored at a receiving device, a selection circuit configured to select video data as one of the key frame or a key frame identifier representing the key frame based on whether the key frame is stored at the receiving device and a transmitter configured to communicate at least one of the video data and the inter-predicted frame.

Implementations can include one or more of the following features. For example, the inter-predicted frame can be one of a forward predicted frame or a bidirectionally predicted frame. The method can further include storing information associated with at least one key frame. The determining of whether the key frame is stored at the receiving device can include determining a video input includes the key frame identifier. The determining of whether the key frame is stored at the receiving device can include determining that the key frame is a graphical element of a user interface, and the key frame identifier is associated with the graphical element of the user interface. The determining whether the key frame is stored at the receiving device can include comparing at least one pixel color associated with the key frame and one of determining the key frame is stored at the receiving device is based on a color difference criterion or a mean square error calculation based on the comparing of the at least one pixel color. The determining of whether the key frame is stored at the receiving device can include generating a histogram based on the key frame and comparing the generated histogram to a stored histogram.

The determining of whether the key frame is stored at the receiving device can include generating a signature based on the key frame and comparing the generated signature to a stored signature. The determining of whether the key frame is stored at the receiving device can include generating at least one object classification and object position based on the key frame using a trained machine learning model, and comparing the at least one object classification and object position to a stored object classification and object position associated with a key frame stored at the receiving device. If the key frame is not stored at the receiving device, the method can further include generating the key frame identifier corresponding to the key frame and causing the key frame and the key frame identifier to be communicated to the receiving device.

The streaming device can receive a video stream including at least one frame and can further include an encoder configured to generate at least one of the key frame and the inter-predicted frame based on the at least one frame, the inter-predicted frame being generated using information from the key frame. The streaming device can further include a memory configured to store information associated with at least one key frame.

In a general aspect, a device, a system, a non-transitory computer-readable medium (having stored thereon computer executable program code which can be executed on a computer system), and/or a method can perform a process with a method including receiving a video stream including at least one of video data and an inter-predicted frame, the video data being at least one of a key frame and a key frame identifier representing the key frame, selecting one of the key frame or a stored key frame based on the video data, and generating a frame of video for display on a display of a play-back device based on at least one of the key frame, the stored key frame, and the inter-predicted frame.

In a general aspect a play-back device includes a receiver configured to receive a video stream including at least one of video data and an inter-predicted frame, the video data being at least one of a key frame and a key frame identifier representing the key frame, and a selection circuit configured to select one of the key frame or a stored key frame based on the video data.

In a general aspect play-back device includes a receiver configured to receive a video stream including at least one of video data and an inter-predicted frame, the video data being at least one of a key frame and a key frame identifier representing the key frame and a decoder including a selection circuit configured to select one of the key frame or a stored key frame based on the video data and a decompression module configured to generate a frame of video for display on a display of the play-back device based on at least one of the key frame, the stored key frame, and the inter-predicted frame.

Implementations can include one or more of the following features. For example, the method can further include selecting the stored key frame from a library including at least one stored key frame. The method can further include determining whether the video data includes the key frame and the key frame identifier and in response to determining the video data includes the key frame and the key frame identifier, store the key frame in relation to the key frame identifier in a key frame library. The method can further include determining whether the video data includes the key frame without the key frame identifier and in response to determining the video data includes the key frame without the key frame identifier, generate the key frame identifier, and store the key frame in relation to the key frame identifier in a key frame library.

The method can further include determining whether the video data includes the key frame identifier without the key frame and in response to determining the video data includes the key frame without the key frame identifier, read the key frame from a key frame library based on the key frame identifier. The method can further include determining whether the video data includes one of the key frame identifier or the key frame, in response to determining the video data includes the key frame identifier without the key frame, read the key frame from a key frame library based on the key frame identifier, and cause selection of the key frame read from the key frame library, and in response to determining the video data includes the key frame without the key frame identifier, cause selection of the key frame included in the video data.

The play-back device can further include a decoder configured to generate a frame of video for display on a display of the play-back device based on at least one of the key frame, the stored key frame, and the inter-predicted frame. The play-back device can further include a controller configured to cause the selection circuit to select one of the key frame or the stored key frame based on the video data and a library including at least one stored key frame.

In a general aspect, a device, a system, a non-transitory computer-readable medium (having stored thereon computer executable program code which can be executed on a computer system), and/or a method can perform a process with a method including generating at least one of a key frame and an inter-predicted frame based on a received video stream including at least one video frame, the inter-predicted frame being generated using information from the key frame, determining whether the key frame is stored at a receiving device, selecting video data as one of the key frame or a key frame identifier representing the key frame based on whether the key frame is stored at the receiving device, communicating at least one of the video data and the inter-predicted frame, receiving the video stream including the at least one of the video data and the inter-predicted frame, selecting one of the key frame or a stored key frame based on the video data, and generating a frame of video for display on a display of a play-back device based on at least one of the key frame, the stored key frame, and the inter-predicted frame.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
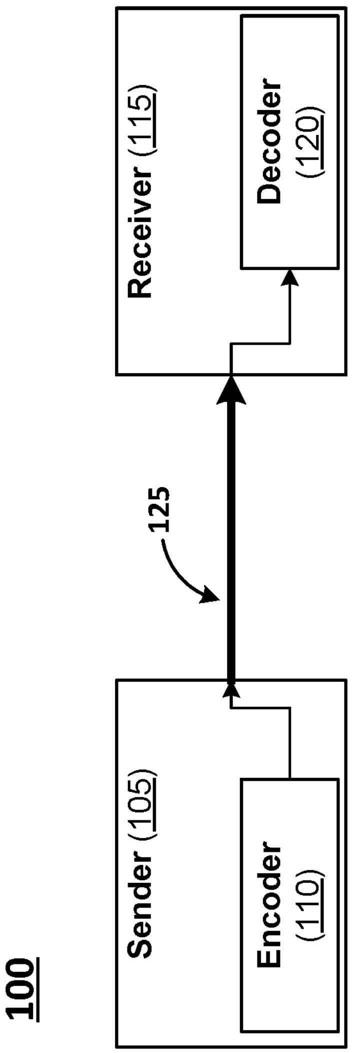
FIG. 1A illustrates a block diagram of a signal flow according to at least one example embodiment.

It should be noted that these Figures are intended to illustrate the general characteristics of methods, and/or structure utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

Video encoding can take advantage of a substantial similarity of frame content in adjacent frames to enable coding of just the differences between successive video frames rather than complete image content. This approach works, in particular, for continuous movement and/or scene content from one frame to the next. Intersperse with the difference frames are full image frames. These may be used, for example, when a scene changes discontinuously, or as periodic or occasional reference-setting frames. In the terminology of video encoding, the full (or largely) full image frames are referred to as intra-coded frames including key frames and/or I-frames (hereinafter key frames). Two types of difference frames can be used, referred to as inter-predicted frames including predictive frames or P-frames and bi-directional frames or B-frames. In the context of video playback, each frame may include a time stamp to specify temporal order in a sequence of frames. Each key frame may be a substantially full digital image representing a moment in the video. Inter-predicted frames, on the other hand, may define changes e.g., as residuals) in relation to one or more other frames, such as vector displacements from a key frame and/or other frames. A video display device may present each key frame at its time-stamped moment and may then render changes to the presented image in accordance with or using inter-predicted frames between successive key frames. The result may appear as smooth motion on the display device.

In video compression, a key frame can be a fully specified frame similar to a conventional static image file. Thus, unlike other frames used in video compression, key frames are coded without reference to any other frame. As a result, a key frame can be larger than (e.g., not compressed as much as) non-key frames.

One of the intended uses for video compression techniques (e.g., AVC, H.264, MPEG-4, and/or the like) can be to reduce the amount of data transmitted over a channel. A channel can be a communication path from one component to another. The channel can be electrical traces on a printed circuit board (PCB), an optical path in a fiber, or a radio path using, for example, WiFi or Bluetooth. Transmitting less data over a channel can allow for the channel to operate at lower power, with reduced speed, with reduced complexity, and/or with reduced cost. The transmission of key frames over a channel can include transmitting an undesirable (e.g., increased) amount of data (as compared to inter-predicted frames) over the channel.

Example implementations can reduce the amount of data associated with transmitting key frames of a video over a channel. For example, when the video includes repeated key frames (e.g., a stationary security camera video, a presentation video with a constant background, a video conference call with a background filter, in a in the menu system of smart glasses, and/or the like), the key frame can be replaced with an identification value identifying the key frame. Then, the video display device can recall (e.g., from memory, from a library, and/or the like) a stored key frame corresponding to the identification value for use in decompressing a frame and displaying the video. The use of the identification value and the stored key frame can reduce the amount of data associated with transmitting key frames of a video over a channel.

FIG. 1A illustrates a block diagram of a signal flow according to at least one example embodiment. As shown in FIG. 1A, a signal flow 100 includes a sender 105 and a receiver 115. The sender 105 and the receiver 115 can be communicatively coupled by a channel 125. The sender 105 can include an encoder 110 and the receiver 115 can include a decoder 120. The sender 105 and the receiver 115 can be configured to operate together to reduce the amount of data associated with transmitting key frames of a video over the channel 125. The channel 125 can be electrical traces on a printed circuit board (PCB), an optical path in a fiber, or a radio path using, for example, WiFi or Bluetooth.

In an example implementation, the sender 105 can be a streaming device and the receiver 115 can be a play-back device. The encoder 110 can be configured to generate at least one of a key frame and an inter-predicted frame based on a video stream. Here, in an example implementation, the video stream can include a plurality of frames which can all have a same resolution and could theoretically all be used as key frames.

The inter-predicted frame can be one of a forward predicted frame and/or a bidirectionally predicted frame. The sender 105, e.g. the controller of the streaming device, and/or the encoder 110 can be configured to determine whether the key frame is stored at the receiving device 115 and to select video data as one of the key frame or a digital value representing the key frame based on whether or not the key frame is stored at the receiving device 115. In other words, the sender 105 can be configured to stream frames of a video without communicating a key frame (e.g., using a key frame identifier in place of a key frame). The receiver 115 can be configured to receive a video stream including at least one of video data and an inter-predicted frame, the video data can be one of a key frame or a digital value representing the key frame. The receiver 115 can be configured to select one of the key frame or a stored key frame based on the video data. The decoder 120 can be configured to generate a frame of video for display on the play-back device based on at least one of the key frame, the stored key frame, and the inter-predicted frame.

The sender 105 can include the encoder 110 and an interface transmitter that can be included as elements in a video compression (e.g., AVC, H.264, MPEG-4, and/or the like) implementation. In addition, example implementations can include control and selection circuit (hereinafter referred to as a multiplexer) components. The controller can be configured to identify a key frame that exists in the receiver's memory. Key frame identification could include a comparison of the key frame with known key frames or by the function of the display system (e.g., a displayed menu can be the start of a user interface). The multiplexer can be configured to insert a key frame identifier into the communication stream (e.g., should a matching key frame be identified.

Figure 1B:
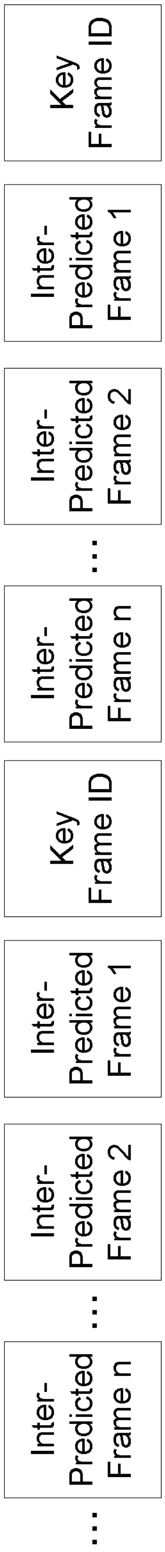
FIG. 1B illustrates a block diagram of frames of a streaming video according to at least one example embodiment.
Figure 2A:
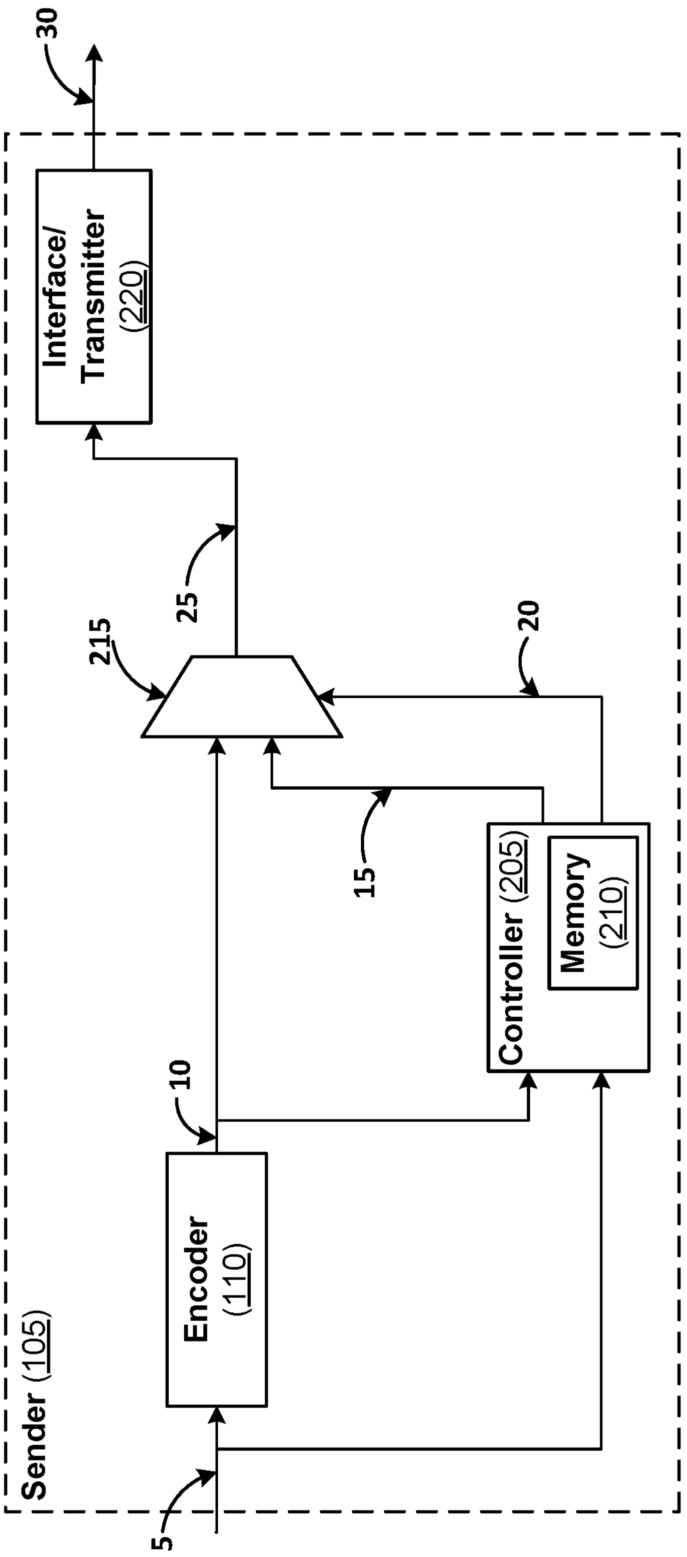
FIG. 2A illustrates a block diagram of a sender system according to at least one example embodiment.
Figure 2B:
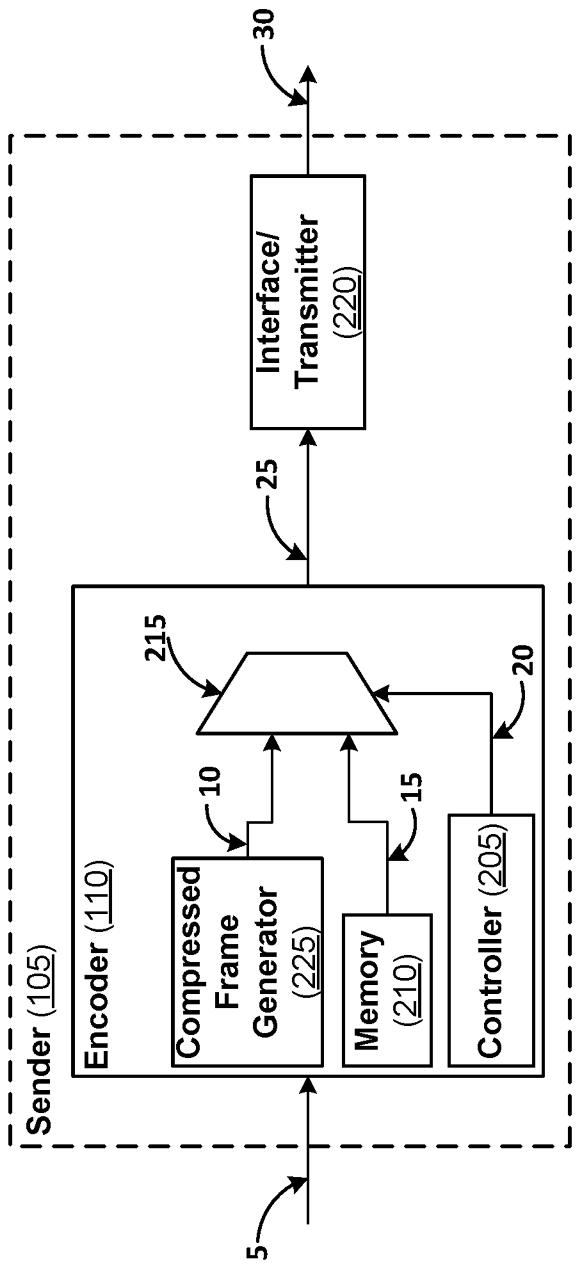
FIG. 2B illustrates a block diagram of another sender system according to at least one example embodiment.
Figure 3A:
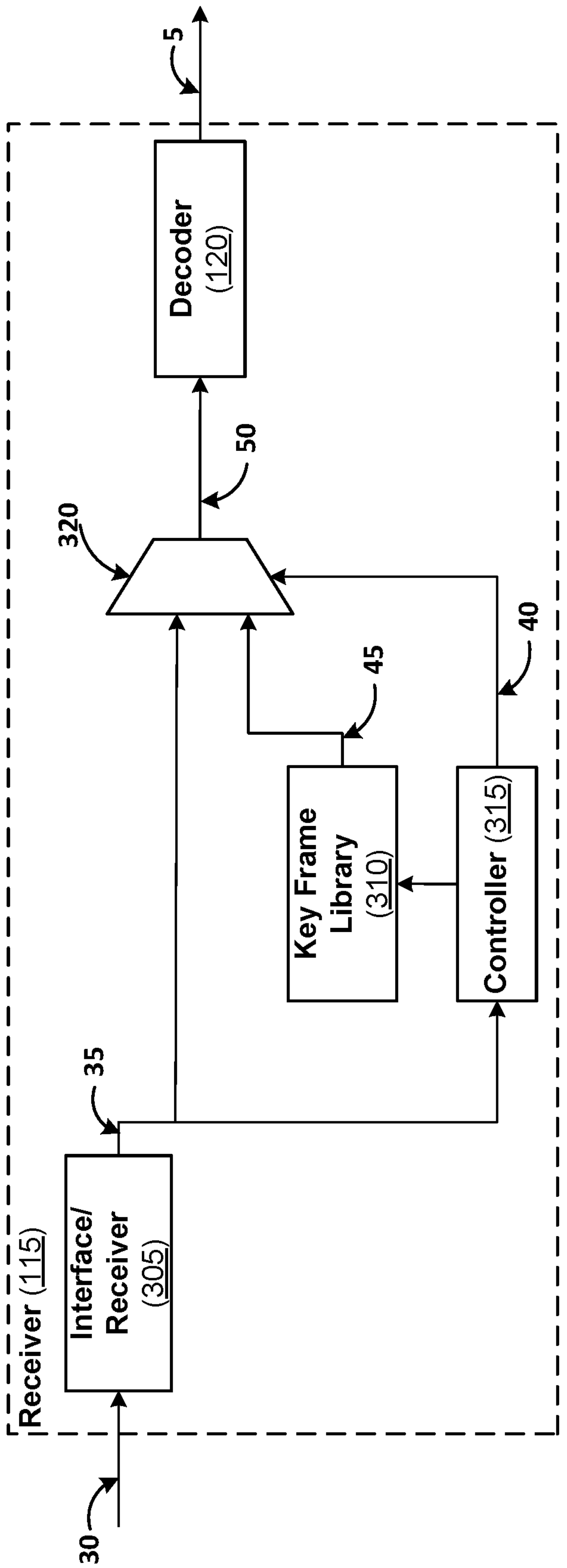
FIG. 3A illustrates a block diagram of a receiver system according to at least one example embodiment.
Figure 3B:
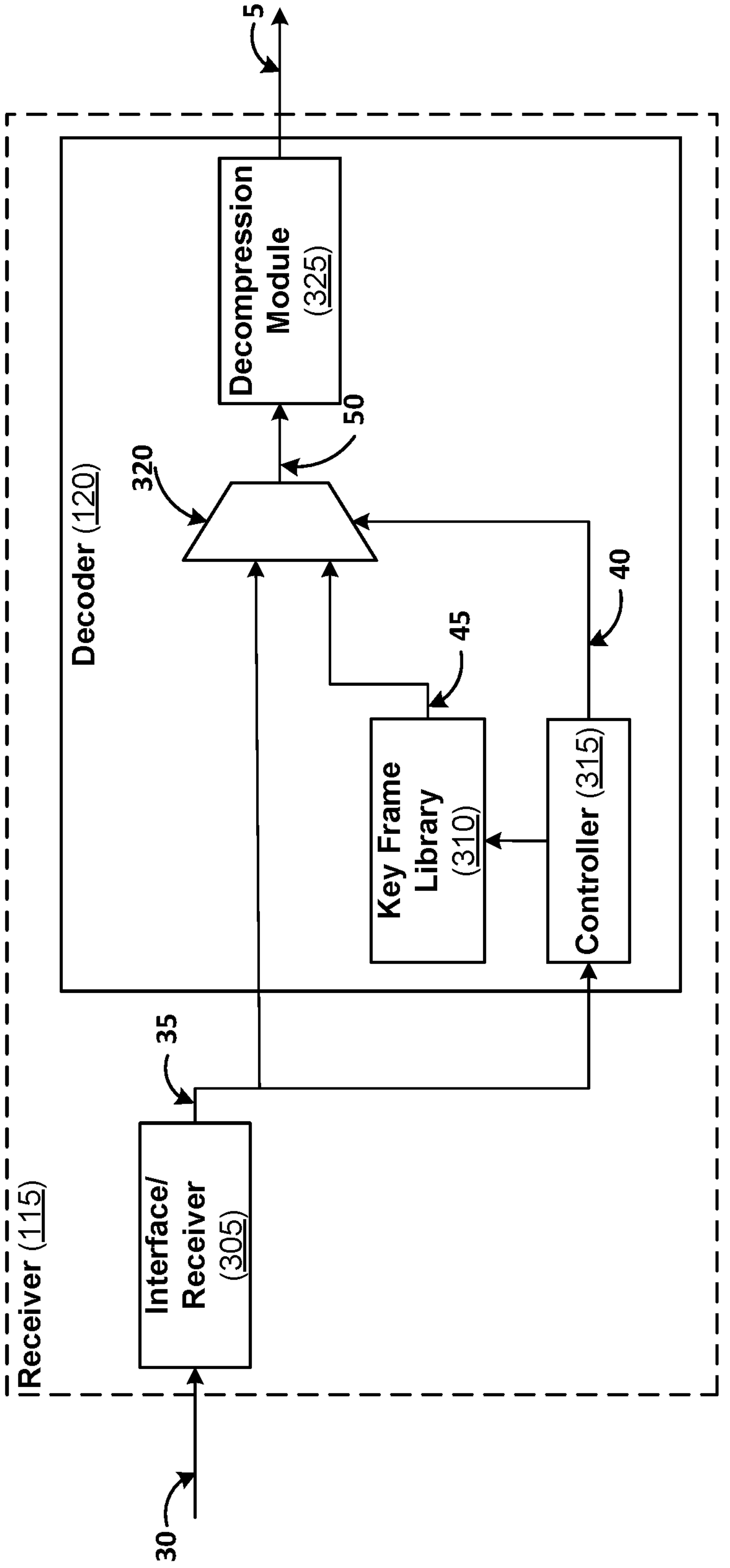
FIG. 3B illustrates a block diagram of another receiver system according to at least one example embodiment.

The receiver 115 can include an interface receiver and the decoder 120 that can be included as elements in a video compression (e.g., AVC, H.264, MPEG-4, and/or the like) implementation. In addition, example implementations can include a key frame library, a controller, and a multiplexer. The controller, with the use of the multiplexer, can be configured to select between an inter-frame and a key frame retrieved from the key frame library. FIG. 1B illustrates a block diagram of frames of a streaming video according to at least one example embodiment. As shown in FIG. 1B, the streaming video can be frames of a video streamed (e.g., communicated) without communicating a key frame. FIG. 1B is illustrated as including at least one key frame identifier and at least one inter-predicted frame. FIGS. 2A and 2B describe the sender 105 and the encoder 110 in more detail. FIGS. 3A and 3B describe the receiver 115 and the decoder 120 in more detail.

FIG. 2A illustrates a block diagram of a sender system according to at least one example embodiment. As shown in FIG. 2A, the sender 105 includes the encoder 110, a controller 205, a memory 210, a multiplexer 215 and an interface/transmitter 220. The memory 210 may or may not be a graphical element of the controller 205. FIG. 2B illustrates a block diagram of another sender system according to at least one example embodiment. As shown in FIG. 2B, the sender 105 includes the encoder 110 and the interface/transmitter 220. The encoder 110 includes the controller 205, the memory 210, the multiplexer 215, and a compressed frame generator 225. The difference between the example implementation of FIG. 2A and FIG. 2B is that in FIG. 2B, the controller 205, the memory, 210 and the multiplexer 215 are included in the encoder 110. Whereas in FIG. 2A, the controller 205, the memory, 210 and the multiplexer 215 are not included in the encoder 110.

The encoder 110 can be configured to compress a plurality of frames of a video 5 (e.g., a streaming video, a user interface interaction (e.g., of a menu), a surveillance video, and/or the like). Alternatively, the compressed frame generator 225 can be configured to compress a plurality of frames of a video 5. The plurality of compressed frames 10 can include at least one key frame and at least one inter-predicted frame. The sender 105 can be configured to process (e.g., compress and/or communicate) one frame of video 5 at a time.

The controller 205 can be configured to determine whether or not one of the plurality of compressed frames 10 is a key frame and to determine whether or not the key frame exists in a memory of the receiver 115. Determining whether or not one of the plurality of compressed frames 10 is a key frame can include reading a tag associated with the frame. If the frame is a key frame, the tag will indicate the frame is a key frame. Alternatively, a frame if the plurality of compressed frames 10 can be compressed as a key frame on a regular (e.g., number of frames, time intervals, and/or the like) basis known by the controller 205. Alternatively, the first frame in the video 5 can be compressed as a key frame. For example, a user interface interaction (e.g., of a menu) can be a sequence of short videos (as video 5) each of which can be compressed with the first frame as the key frame.

Determining whether or not a key frame exists in the memory of the receiver 115 can include a comparison of the key frame with known key frames or by the function of the display system (e.g., a displayed menu can be the start of a user interface). For example, the comparison can be a pixel-by-pixel comparison. The pixel-by-pixel comparison can include reading the pixel color(s) for a pixel of the key frame and reading the pixel color(s) for a pixel of a stored key frame at a same coordinate and comparing the pixel color(s). If the color(s) at each coordinate (or a threshold percentage of coordinates) are the same (or within a threshold difference), the key frame and the stored key frame match. This process can be repeated for each stored key frame. The stored key frame(s) can be included in memory 210. The stored key frame(s) in memory 210 can also be in a memory (e.g., a library) of the receiver 115.

The comparison can be a pixel color (e.g., red, green, blue) difference comparison. The pixel color difference can include summing the pixel values for each pixel of the key frame and summing the pixel values for each pixel of the stored key frame and calculating the difference. If the difference meets a criterion (e.g., less than a threshold value), the key frame and the stored key frame match. This process can be repeated for each stored key frame. The pixel color difference can be based on each color and/or all colors combined.

The comparison can be a pixel color (e.g., red, green, blue) histogram comparison. The pixel color histogram can include generating a pixel histogram for each pixel color of the key frame and generating a pixel histogram for each pixel color of the stored key frame and calculating the difference. If the histogram meets a criterion (e.g., less than a threshold difference for each color), the key frame and the stored key frame match. This process can be repeated for each stored key frame.

The comparison can be a frame image signature (or digital signature, signature value, and/or the like) comparison. A signature can be the result of applying a function to the pixel color values of an image. Applying the function should result in a unique signature corresponding to substantially unique images. Therefore, if two key frames have the same signature, the two key frames should match. The signature comparison can include generating a signature for the key frame and generating a signature for the stored key frame and calculating the difference. If comparing the signatures meets a criterion (e.g., the signature values are the same), the key frame and the stored key frame match. This process can be repeated for each stored key frame.

The comparison can be a mean square error (MSE) calculation based on the image of two frames. The MSE calculation can be the sum of the squared difference between the image of two frames. The pixel color MSE can include generating a MSE calculation based on the key frame and the stored key frame. If the MSE meets a criterion (e.g., less than a threshold value), the key frame and the stored key frame match. This process can be repeated for each stored key frame. The MSE can be based on each color and/or all colors combined.

The comparison can use a trained machine learned (ML) model. The trained ML model can classify objects and object positions in a frame image. Therefore, if two key frames have the object and position (e.g., within the frame image) classifications, the two key frames match. The ML model comparison can include generating object and position classifications for the key frame and generating object and position classifications for the stored key frame. If comparing the object and position classifications meets a criterion (e.g., the object and position classifications values are the same), the key frame and the stored key frame match. This process can be repeated for each stored key frame.

The comparison can be a frame image texture comparison. The frame image texture comparison can be based on any of the above comparisons. However, instead of the comparison being based on pixel color, the comparison can be based on pixel texture. The comparison can be a watermark comparison. For example, key frames can include a unique watermark (e.g., a non-visible digital structure that is different for each key frame in a video). If the watermarks are the same, the key frame and the stored key frame match. This process can be repeated for each stored key frame.

In each of the above example implementations, the result of the comparison may not be an exact match. For example, a comparison that results in an indication that the two key frames match within a criterion (e.g., a threshold difference), can result in determining that the key frames are a match. The criterion can be determined based on a resultant quality of a reconstructed image or frame. In this example implementation, generating an inter-predicted frame can use the stored key-frame in place of (e.g., substituted for) the current (e.g., associated with the streaming video) key frame. Further, example implementations can include a comparison of an un-encoded key frame and/or an encoded (compressed) key frame.

Alternatively, video 5 can include key frame identifiers instead of key frame images. If the video 5 uses key frame identifiers, the stored key frames can include an associated key frame identifier. These stored key frames including an associated key frame identifier can be preinstalled in a memory of the receiver 115. These stored key frames including an associated key frame identifier can be in a memory of a network device communicatively coupled to the receiver 115. In this implementation, the receiver 115 can request the stored key frame from the network device, or request a plurality of key frames with associated key frame identifiers from the network device based on, for example, the video, an application, a user interface, and/or the like.

In an example implementation, the memory 210 can include key frame identifiers instead of key frame images. For example, the memory 210 can include a signature, a histogram, a watermark, and/or the like as a key frame identifier representing a key frame image. Therefore, key frame comparisons can be based on generating a signature, a histogram, a watermark, and/or the like of the current key frame and comparing the result to a signature, a histogram, a watermark, and/or the like stored in the memory 210. Other frame image comparison techniques are within the scope of this disclosure.

The controller 205 can output a key frame identifier, or a key frame and associated key frame identifier as key frame data 15. In addition, the controller 205 can output a control signal 20. The multiplexer 215 can output video data 25. The multiplexer 215 can output video data 25 based on the control signal 20. The control signal 20 can cause the multiplexer 215 to select between the compressed frame 10 or the key frame data 15. In other words, video data 25 can be an inter-predicted frame or key the frame data 15 (e.g., a key frame identifier or a key frame/key frame identifier combination). The interface/transmitter 220 can be configured to format the video data 25 for communication based on an encoder/decoder standard (e.g., AVC, H.264, MPEG-4, and/or the like) and communicate the formatted video data 30 over the channel 125.

FIG. 3A illustrates a block diagram of a receiver system according to at least one example embodiment. As shown in FIG. 3A, the receiver 115 includes an interface/receiver 305, a key frame library 310, a controller 315, a multiplexer 320, and the decoder 120. FIG. 3B illustrates a block diagram of another receiver system according to at least one example embodiment. As shown in FIG. 3B, the receiver 115 includes the interface/receiver 305 and the decoder 120. The decoder 120 includes the key frame library 310, the controller 315, and the multiplexer 320. The difference between the example implementation of FIG. 3A and FIG. 3B is that in FIG. 3B, the controller 315, the memory, 310 and the multiplexer 320 are included in the decoder 120. Whereas in FIG. 3A, the controller 315, the memory, 310 and the multiplexer 320 are not included in the decoder 120.

The interface/receiver 305 can be configured to receive the formatted video data 30 via the channel 125 and to generate video data 35 based on the formatted video data 30. The video data 35 can be an inter-predicted frame or key the frame data (e.g., a key frame identifier or a key frame/key frame identifier combination).

The controller 315 can be configured to determine whether or not the video data 35 includes a key frame and/or a key frame identifier. If the video data 35 includes a key frame and/or a key frame identifier, the controller 315 can be configured to determine whether or not the key frame library 310 includes the key frame. For example, the video data 35 may include only a key frame identifier. In this case the key frame library 310 should include the key frame and the controller can cause the key frame library 310 to communicate a key frame 45 based on the key frame identifier.

If the video data 35 includes a key frame and a key frame identifier, the controller 315 can be configured to cause the key frame library 310 to store the key frame in relation to the key frame identifier. In addition, the controller 315 can output a control signal 40. The multiplexer 320 can output compressed video data 50. The multiplexer 215 can output compressed video data 50 based on the control signal 40. The control signal 40 can cause the multiplexer 320 to select between the video data 35 or the key frame 45. In other words, compressed video data 50 can be an inter-predicted frame or key the frame 45. The decoder 120 and/or the decompression module 325 can be configured to generate video 5 (as a reconstructed video) by decompressing the compressed video data 50 using the same encoder/decoder standard used to generate compressed frame 10.

The key frame library 310 can include the key frames that are required to decode a video stream. The key frame library 310 can be implemented in ROM, SRAM or some other permanent or temporary storage. The key frame library 310 can be pre-loaded with the key frames that would be used in a system. The key frame library can be loaded during a design phase (ROM), by the receiver 115 (e.g., read from a network device), as received from the sender 105 via the channel 125.

Figure 4A:
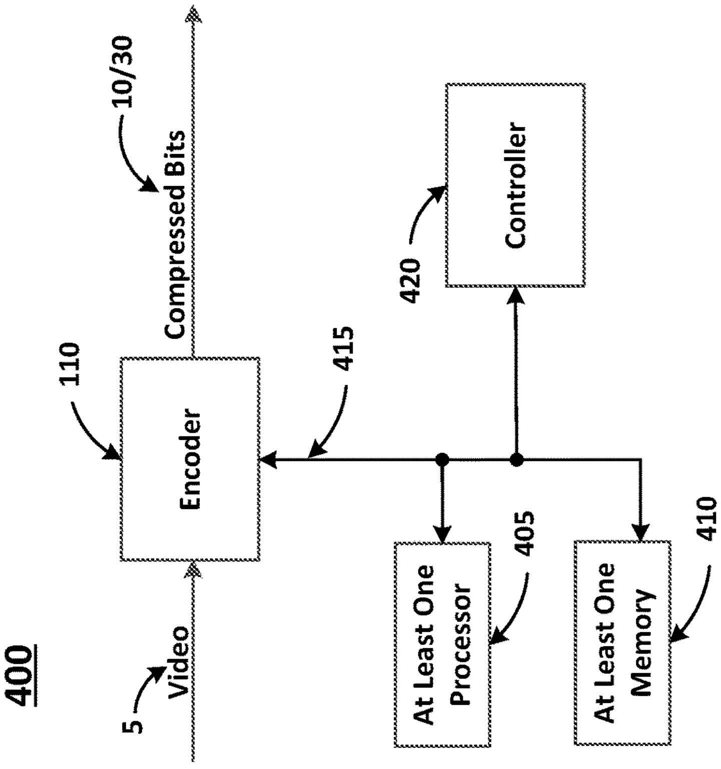
FIG. 4A illustrates a block diagram of an encoder system according to at least one example embodiment.

FIG. 4A illustrates the encoder system according to at least one example embodiment. As shown in FIG. 4A, the encoder system 400 includes the at least one processor 405, the at least one memory 410, a controller 420, and the encoder 110. The at least one processor 405, the at least one memory 410, the controller 420, and the encoder 110 are communicatively coupled via bus 415.

In the example of FIG. 4A, an encoder system 400 may be, or include, at least one computing device and should be understood to represent virtually any computing device configured to perform the techniques described herein. As such, the encoder system 400 may be understood to include various components which may be utilized to implement the techniques described herein, or different or future versions thereof. By way of example, the encoder system 400 is illustrated as including at least one processor 405, as well as at least one memory 410 (e.g., a non-transitory computer readable storage medium).

The at least one processor 405 may be utilized to execute instructions stored on the at least one memory 410. Therefore, the at least one processor 405 can implement the various features and functions described herein, or additional or alternative features and functions. The at least one processor 405 and the at least one memory 410 may be utilized for various other purposes. For example, the at least one memory 410 may represent an example of various types of memory and related hardware and software which may be used to implement any one of the modules described herein.

The at least one memory 410 may be configured to store data and/or information associated with the encoder system 400. The at least one memory 410 may be a shared resource. For example, the encoder system 400 may be an element of a larger system (e.g., a server, a personal computer, a mobile device, and/or the like). Therefore, the at least one memory 410 may be configured to store data and/or information associated with other elements (e.g., image/video serving, web browsing or wired/wireless communication) within the larger system.

The controller 420 may be configured to generate various control signals and communicate the control signals to various blocks in the encoder system 400. The controller 420 may be configured to generate the control signals to implement the techniques described herein. The controller 420 may be configured to control the encoder 110 to encode an image, a sequence of images, a video frame, a sequence of video frames, and/or the like according to example implementations. For example, the controller 420 may generate control signals corresponding to selecting an encoding mode.

The encoder 110 may be configured to receive an input image 5 (and/or a video stream) and output compressed (e.g., encoded) bits 10. The encoder 110 may convert a video input into discrete video frames (e.g., as images). The input image 5 may be compressed (e.g., encoded) as compressed image bits. The encoder 110 may further convert each image (or discrete video frame) into a C×R matrix of blocks or macro-blocks (hereinafter referred to as blocks). For example, an image may be converted to a 32×32, a 32×16, a 16×16, a 16×8, an 8×8, a 4×8, a 4×4 or a 2×2 matrix of blocks each having a number of pixels. Although eight (8) example matrices are listed, example implementations are not limited thereto. Further, the encoder 110 may be configured to (and/or be included in a system configured to) stream video without key frames and/or using at least one key frame identifier in place of at least one key frame.

The compressed bits 10 may represent the output of the encoder system 400. For example, the compressed bits 10 may represent an encoded image (or video frame). For example, the compressed bits 10 may be stored in a memory (e.g., at least one memory 410). For example, the compressed bits 10 may be ready for transmission to a receiving device (not shown). For example, the compressed bits 10 may be transmitted to a system transceiver (not shown) for transmission to the receiving device.

The at least one processor 405 may be configured to execute computer instructions associated with the controller 420 and/or the encoder 110. The at least one processor 405 may be a shared resource. For example, the encoder system 400 may be an element of a larger system (e.g., a mobile device, a server, and/or the like). Therefore, the at least one processor 405 may be configured to execute computer instructions associated with other elements (e.g., image/video serving, web browsing or wired/wireless communication) within the larger system.

Figure 4B:
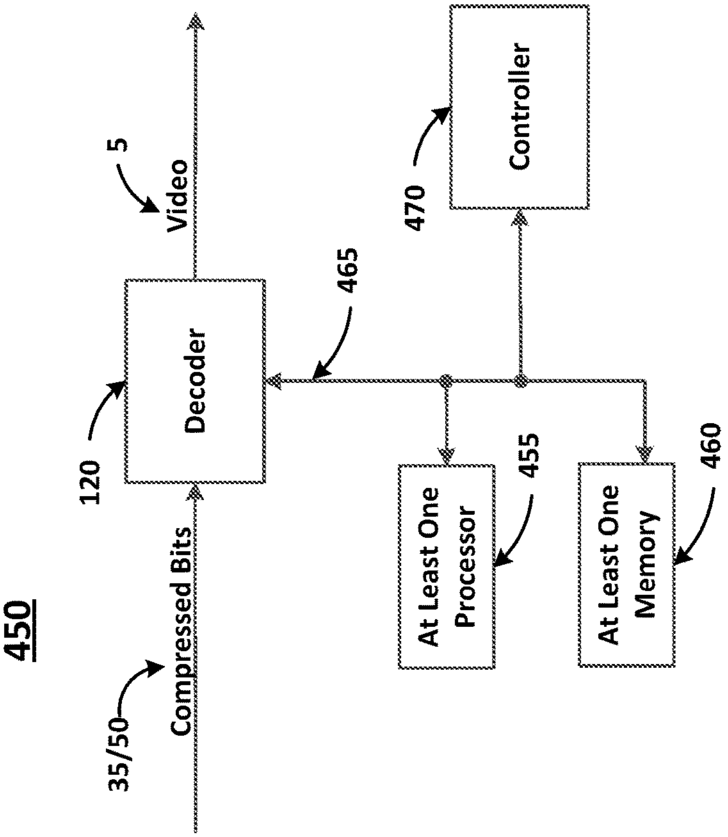
FIG. 4B illustrates a block diagram of a decoder system according to at least one example embodiment.

FIG. 4B illustrates a block diagram of a decoder system according to at least one example embodiment. As shown in FIG. 4B, the decoder system 450 includes the at least one processor 455, the at least one memory 460, a controller 470, and the decoder 120. The at least one processor 455, the at least one memory 460, the controller 470, and the decoder 120 are communicatively coupled via bus 465.

In the example of FIG. 4B, a decoder system 450 may be at least one computing device and should be understood to represent virtually any computing device configured to perform the techniques described herein. As such, the decoder system 450 may be understood to include various components which may be utilized to implement the techniques described herein, or different or future versions thereof. For example, the decoder system 450 is illustrated as including at least one processor 455, as well as at least one memory 460 (e.g., a computer readable storage medium).

Therefore, the at least one processor 455 may be utilized to execute instructions stored on the at least one memory 460. As such, the at least one processor 455 can implement the various features and functions described herein, or additional or alternative features and functions. The at least one processor 455 and the at least one memory 460 may be utilized for various other purposes. For example, the at least one memory 460 may be understood to represent an example of various types of memory and related hardware and software which can be used to implement any one of the modules described herein. According to example implementations, the encoder system 400 and the decoder system 450 may be included in a same larger system (e.g., a personal computer, a mobile device and the like).

The at least one memory 460 may be configured to store data and/or information associated with the decoder system 450. The at least one memory 460 may be a shared resource. For example, the decoder system 450 may be an element of a larger system (e.g., a personal computer, a mobile device, and the like). Therefore, the at least one memory 460 may be configured to store data and/or information associated with other elements (e.g., web browsing or wireless communication) within the larger system.

The controller 470 may be configured to generate various control signals and communicate the control signals to various blocks in the decoder system 450. The controller 470 may be configured to generate the control signals in order to implement the video encoding/decoding techniques described herein. The controller 470 may be configured to control the decoder 120 to decode a video frame according to example implementations.

The decoder 120 may be configured to receive compressed (e.g., encoded) bits 10 as input and output an image 5. The compressed (e.g., encoded) bits 10 may also represent compressed video bits (e.g., a video frame). Therefore, the decoder 120 may convert discrete video frames of the compressed bits 10 into a video stream. The decoder 120 can be configured to (and/or be included in a system configured to) decompress (e.g., decode) a streamed video communicated without key frames and/or including at least one key frame identifier in place of at least one key frame.

The at least one processor 455 may be configured to execute computer instructions associated with the controller 470 and/or the decoder 120. The at least one processor 455 may be a shared resource. For example, the decoder system 450 may be an element of a larger system (e.g., a personal computer, a mobile device, and the like). Therefore, the at least one processor 455 may be configured to execute computer instructions associated with other elements (e.g., web browsing or wireless communication) within the larger system.

An uncompressed video stream (e.g., video 5) can be input to the encoder 110 in the sender 105. The encoder 110 can process each frame (e.g., an image) according to a video compression standard (e.g., AVC, H.264, MPEG-4, and/or the like). A controller (e.g., controller 205) can determine whether or not a key frame is in a key frame library (e.g., key frame library 310). The controller can determine whether to use the compressed key frame or a key frame identifier by, for example, determining that a display on a play-back device will use standard images as a key frame, comparing the compressed key frame with known key frame library contents.

Once the key frame identifier is known, a multiplexer (e.g., multiplexer 215) can be used to inject key frame select information (e.g., a key frame, a key frame identifier, and/or the like) in a transmit stream of the sender 105. The key frame identifier can be on the order of bytes, whereas the compressed key frame can be on the order of many Kilobytes or Megabytes. Example can reduce (even eliminate) the transmission of a compressed key frame.

A controller (e.g., controller 315) can monitor received video data. When a key frame identifier is received, the controller can select and provide key frame data (e.g., a compressed key frame) from the key frame library. A multiplexer (e.g., multiplexer 320) can be used to switch between the received video data stream (e.g., B-frames and P-frames) and the key frame library contents (e.g., compressed I-frames). A decoder (e.g., decoder 120) can process the video data stream according to a video decompression standard (e.g., AVC, H.264, MPEG-4, and/or the like).

Figure 5:
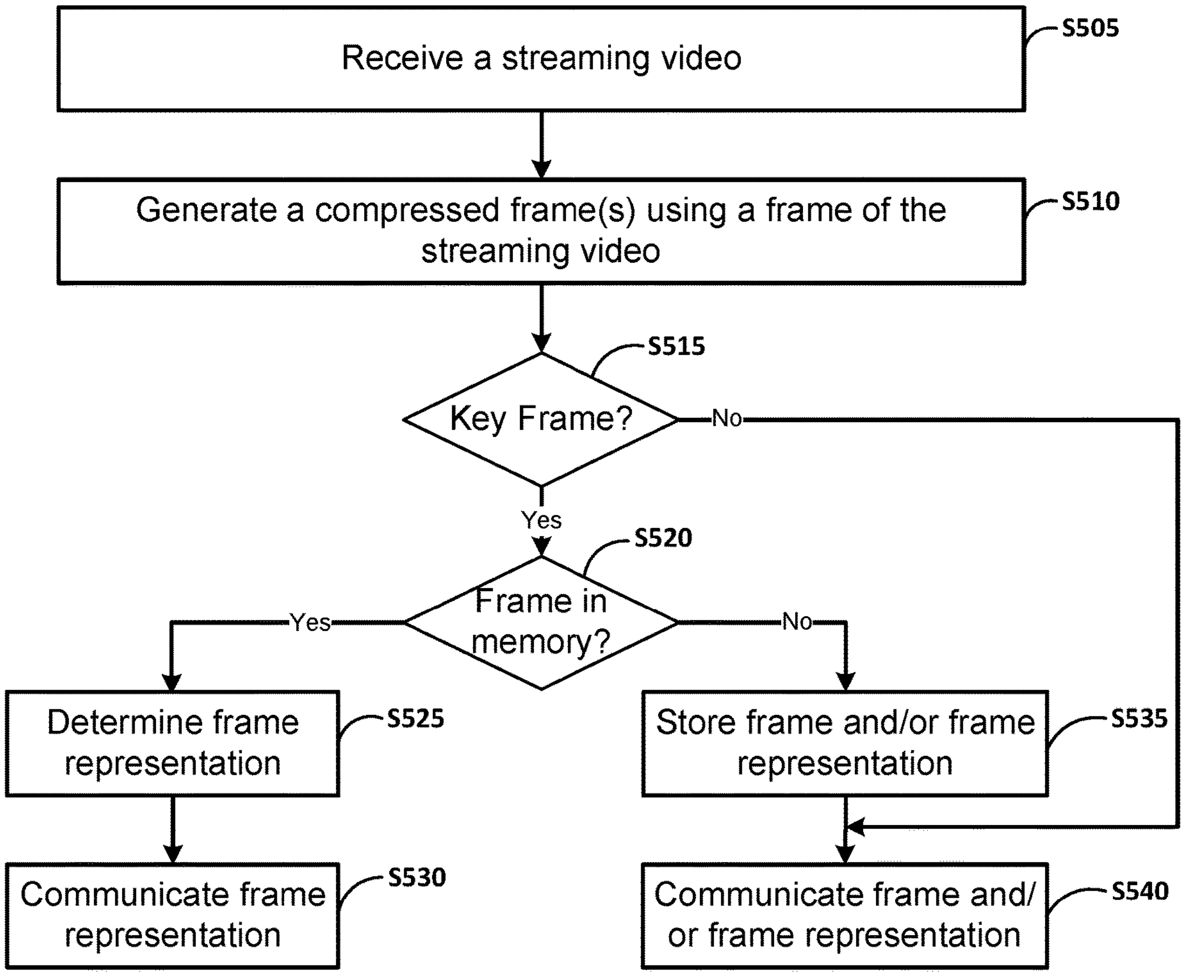
FIG. 5 illustrates a flow diagram of a method of streaming a video according to at least one example embodiment.

In the case where a key frame is not included in a key frame library, key frames can be processed by the receiver 115 and stored in the key frame library. If a video stream, with an un-stored key frame is detected in the sender, the key frame can be transmitted and followed by inter-predicted frames (e.g., B-frames and/or P-frames) and processed. The new key frame can be replicated and stored in the key frame library (e.g., if reuse is expected). FIG. 5 describes the operation of the sender (e.g., sender 105) in more detail and FIG. 6 describes the operation of the receiver (e.g., receiver 115) in more detail FIG. 5 illustrates a flow diagram of a method of streaming a video according to at least one example embodiment. As shown FIG. 5, in step S505 a streaming video is received. For example, a video (e.g., video 5) can be a streaming video, a user interface interaction (e.g., of a menu), a surveillance video, and/or the like.

In step S510 a compressed frame(s) is generated using a frame of the streaming video. For example, an encoder (e.g., encoder 110) can compress each frame of the streaming video using an encoder/decoder standard (e.g., AVC, H.264, MPEG-4, and/or the like). The compressed frame can be an intra-coded or an inter-predicted frame. Intra-predicted frames can include key frames and/or I-frames. Inter-predicted frames can include predictive frames or P-frames and bi-directional frames or B-frames. Accordingly, an encoder can generate (e.g., output) intra-predicted frames (e.g., key frames and/or I-frames) and/or inter-predicted frames (e.g., P-frames and/or B-frames). In some implementations, the intra-predicted frames (e.g., key frames and/or I-frames) can be a key frame identifier referencing a key frame or I-frame.

In step S515 whether the frame is a key frame is determined. For example, a compressed frame can include a tag identifying the frame as a key frame (or I-frame). Alternatively, the frame can be a key frame identifier instead of an image frame. The frame can be determined to be a key frame based on the tag and/or the key frame identifier. If the frame is a key frame, processing continues to step S520. Otherwise, if the frame is not a key frame, processing continues to step S540.

In step S520 whether the key frame is stored in memory is determined. For example, a memory can include a plurality of key frames and/or key frame identifier. Determining if the key frame is stored in memory, can include determining if the key frame and/or key frame identifier matches one of the plurality of key frames and/or key frame identifiers stored in the memory. If the key frame is stored in memory, processing continues to step S525. Otherwise, if the key frame is not stored in memory, processing continues to step S525.

Determining whether or not a key frame is stored in the memory (e.g., memory 210 and/or key frame library 310) can include a comparison of the key frame with known key frames or by the function of the display system (e.g., a displayed menu can be the start of a user interface). For example, the comparison can be a pixel-by-pixel comparison. The pixel-by-pixel comparison can include reading the pixel color(s) for a pixel of the key frame and reading the pixel color(s) for a pixel of a stored key frame at a same coordinate and comparing the pixel color(s). If the color(s) at each coordinate (or a threshold percentage of coordinates) are the same (or withing a threshold difference), the key frame and the stored key frame match. This process can be repeated for each stored key frame.

The comparison can be a pixel color (e.g., red, green, blue) difference comparison. The pixel color difference can include summing the pixel values for each pixel of the key frame and summing the pixel values for each pixel of the stored key frame and calculating the difference. If the difference meets a criterion (e.g., less than a threshold value), the key frame and the stored key frame match. This process can be repeated for each stored key frame. The pixel color difference can be based on each color and/or all colors combined.

The comparison can be a pixel color (e.g., red, green, blue) histogram comparison. The pixel color histogram can include generating a pixel histogram for each pixel color of the key frame and generating a pixel histogram for each pixel color of the stored key frame and calculating the difference. If the histogram meets a criterion (e.g., less than a threshold difference for each color), the key frame and the stored key frame match. This process can be repeated for each stored key frame.

The comparison can be a frame image signature (or digital signature, signature value, and/or the like) comparison. A signature can be the result of applying a function to the pixel color values of an image. Applying the function should result in a unique signature corresponding to substantially unique images. Therefore, if two key frames have the same signature, the two key frames should match. The signature comparison can include generating a signature for the key frame and generating a signature for the stored key frame and calculating the difference. If comparing the signatures meets a criterion (e.g., the signature values are the same), the key frame and the stored key frame match. This process can be repeated for each stored key frame.

The comparison can be a mean square error (MSE) calculation based on the image of two frames. The MSE calculation can be the sum of the squared difference between the image of two frames. The pixel color MSE can include generating a MSE calculation based on the key frame and the stored key frame. If the MSE meets a criterion (e.g., less than a threshold value), the key frame and the stored key frame match. This process can be repeated for each stored key frame. The MSE can be based on each color and/or all colors combined.

The comparison can use a trained machine learned (ML) model. The trained ML model can classify objects and object positions in a frame image. Therefore, if two key frames have the object and position (e.g., within the frame image) classifications, the two key frames match. The ML model comparison can include generating object and position classifications for the key frame and generating object and position classifications for the stored key frame. If comparing the object and position classifications meets a criterion (e.g., the object and position classifications values are the same), the key frame and the stored key frame match. This process can be repeated for each stored key frame.

The comparison can be a frame image texture comparison. The frame image texture comparison can be based on any of the above comparisons. However, instead of the comparison being based on pixel color, the comparison can be based on pixel texture. The comparison can be a watermark comparison. For example, key frames can include a unique watermark (e.g., a non-visible digital structure that is different for each key frame in a video). If the watermarks are the same, the key frame and the stored key frame match. This process can be repeated for each stored key frame.

Alternatively, the video (e.g., video 5) can include key frame identifiers instead of key frame images. If the video uses key frame identifiers, the stored key frames can include an associated key frame identifier. These stored key frames including an associated key frame identifier can be preinstalled in a memory of a play-back device (e.g., receiver 115). These stored key frames including an associated key frame identifier can be in a memory of a network device communicatively coupled to the play-back device. In this implementation, the play-back device can request the stored key frame from the network device, or request a plurality of key frames with associated key frame identifiers from the network device based on, for example, the video, an application, a user interface, and/or the like. A play-back device can be a television, a mobile phone, a computer monitor, an augmenter reality head set and/or the like.

In an example implementation, the memory can include key frame identifiers instead of key frame images. For example, the memory can include a signature, a histogram, a watermark, and/or the like as a key frame identifier representing a key frame image. Therefore, key frame comparisons can be based on generating a signature, a histogram, a watermark, and/or the like of the current key frame and comparing the result to a signature, a histogram, a watermark, and/or the like stored in the memory. Other frame image comparison techniques are within the scope of this disclosure.

In step S525 a frame representation is determined. For example, the frame representation can be a key frame identifier. The key frame identifier can be a numeric value (e.g., sequentially created as key frames are added to memory), a signature, a histogram, a watermark, and/or the like.

In step S530 the frame representation is communicated. For example, when a key frame is stored in the memory (e.g., key frame library 310) of the play-back device, instead of communicating the compressed key frame (or I-frame), the key frame identifier can be communicated in the compressed video stream. The key frame identifier can be formatted for communication based on an encoder/decoder standard (e.g., AVC, H.264, MPEG-4, and/or the like) and communicated (e.g., via the channel 125).

In step S535 the frame and/or the frame representation is stored. For example, if the frame is a key frame that is not stored in memory, the frame and/or the frame representation can be stored in the memory (e.g., memory 210). The frame and/or the frame representation is stored in memory so that the next time the key frame appears in the video stream, a key frame representation is communicated in the compressed video stream.

In step S540 frame and/or frame representation is communicated. For example, an inter-predicted frame (e.g., a non-key frame, P-frame, B-frame, and/or the like). The inter-predicted frame (e.g., as video data 25) can be formatted for communication based on an encoder/decoder standard (e.g., AVC, H.264, MPEG-4, and/or the like) and communicated (e.g., via the channel 125). If the frame is a key frame that is not stored in the memory (e.g., key frame library 310) of the playback device, the compressed key frame (e.g., as video data 25) can be formatted for communication based on an encoder/decoder standard and communicated (e.g., via the channel 125). If the frame is a key frame identifier that is received in the uncompressed video stream, the key frame identifier (e.g., as video data 25) can be formatted for communication based on an encoder/decoder standard and communicated (e.g., via the channel 125). In some implementations the key frame identifier is communicated together with the compressed key frame.

Figure 6:
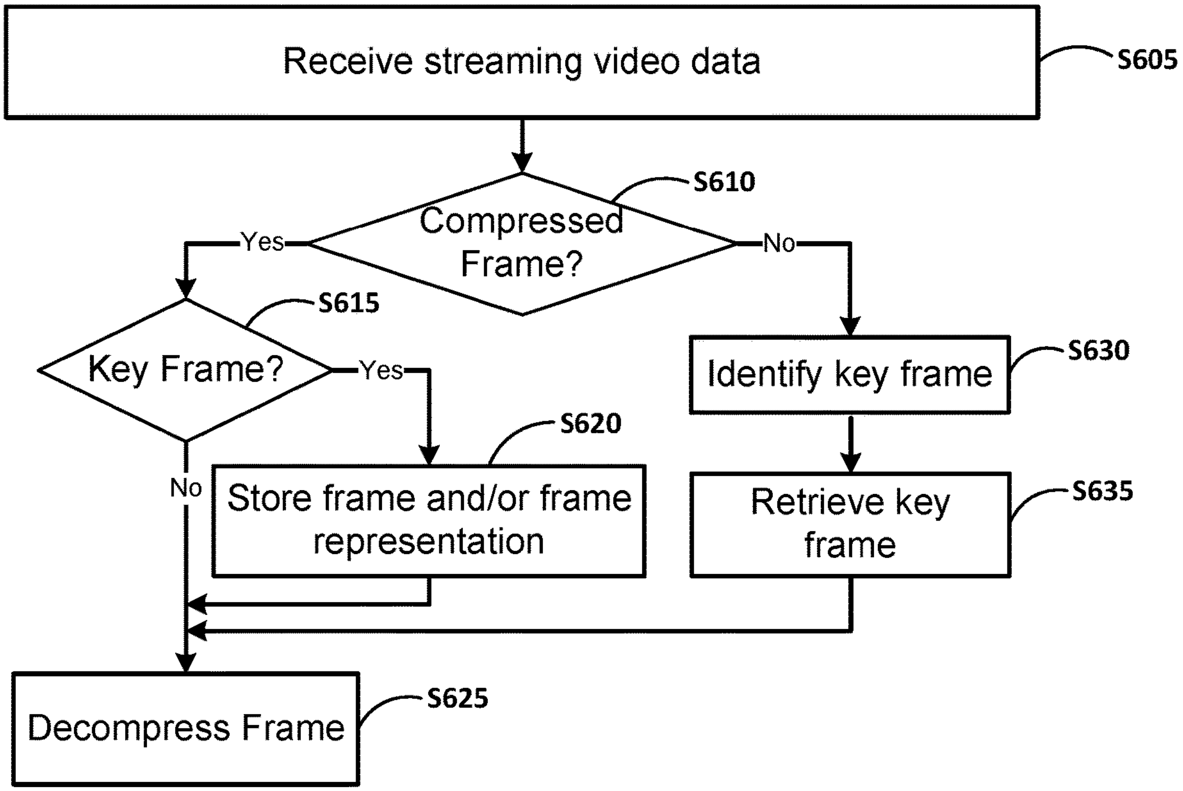
FIG. 6 illustrates a flow diagram of a method of decoding a video according to at least one example embodiment.

FIG. 6 illustrates a flow diagram of a method of decoding a video according to at least one example embodiment. As shown FIG. 6, in step S605 streaming video data is received. For example, a compressed video (e.g., video 30) can be a compressed (or encoded version of a streaming video, a user interface interaction (e.g., of a menu), a surveillance video, and/or the like. The streaming video data can be formatted for communication based on an encoder/decoder standard (e.g., AVC, H.264, MPEG-4, and/or the like). The compressed video data can include at least one of an inter-predicted frame (e.g., a non-key frame, P-frame, B-frame, and/or the like), an intra-predicted frame (e.g., a key frame, or an I-frame), and/or data representing a key frame (e.g., a key frame identifier).

In step S610 whether a frame of the video data is a compressed frame (e.g., the current frame to be decompressed) is determined. For example, a frame of the video data can be a frame image as a key frame or an inter-predicted frame or a key frame identifier. If the frame is the key frame identifier, the frame of the video data is not a compressed frame. If the frame of the video data is a compressed frame, processing continues to step S615. Otherwise, if the frame of the video data is not a compressed frame, processing continues to step S630.

In step S615 whether the frame is a key frame is determined. For example, a compressed frame can include a tag identifying the frame as a key frame (or I-frame). Alternatively, the frame can include the compressed frame and a key frame identifier. The frame can be determined to be a key frame based on the tag and/or the key frame identifier. If the frame is a key frame, processing continues to step S620. Otherwise, if the frame is not a key frame, processing continues to step S625.

In step S620 a frame and/or frame representation is stored. For example, if the frame is a key frame that is not stored in memory, the frame and/or the frame representation can be stored in a key frame library (e.g., key frame library 310). The frame and/or the frame representation is stored in the key frame library so that the next time the key frame appears in a compressed video stream as a key frame identifier, a key frame can be retrieved from the key frame library based on the key frame identifier.

In step S625 the frame is decompressed. For example, the compressed frame can be decompressed using the same encoder/decoder standard (e.g., AVC, H.264, MPEG-4, and/or the like) used to generate the compressed frame.

In step S630 a key frame is identified. For example, the key frame can be looked up (e.g., searched for) in the key frame library based on the key frame identifier. In step S635 the key frame is retrieved. For example, the key frame can be read from the key frame library.

Figure 7:
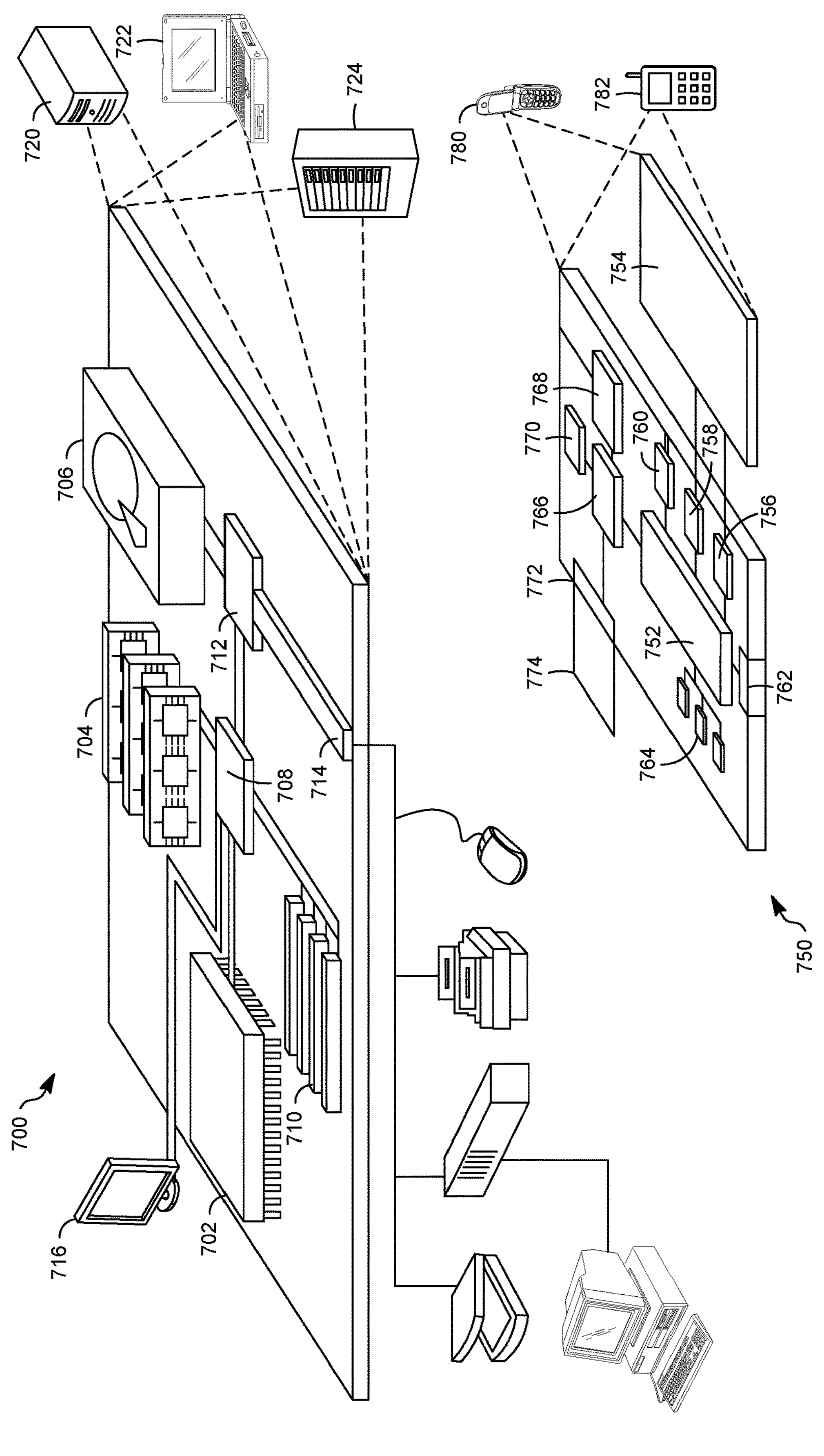
FIG. 7 shows an example of a computer device and a mobile computer device according to at least one example embodiment.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

In a general aspect, a device, a system, a non-transitory computer-readable medium (having stored thereon computer executable program code which can be executed on a computer system), and/or a method can perform a process with a method including generating at least one of a key frame and an inter-predicted frame based on a received video stream including at least one video frame, the inter-predicted frame being generated using information from the key frame, determining whether the key frame is stored at a receiving device, selecting video data as one of the key frame or a key frame identifier representing the key frame based on whether the key frame is stored at the receiving device, and communicating at least one of the video data and the inter-predicted frame.

In a general aspect, a streaming device includes a controller configured to determine whether a key frame is stored at a receiving device, a selection circuit configured to select video data as one of the key frame or a key frame identifier representing the key frame based on determining whether the key frame is stored at the receiving device, and a transmitter configured to communicate at least one of the video data and an inter-predicted frame.

In a general aspect an encoder includes a compressed frame generator configured to generate at least one of a key frame and an inter-predicted frame based on a received video stream including at least one frame, the inter-predicted frame being generated using information from the key frame, a controller configured to determine whether the key frame is stored at a receiving device, a selection circuit configured to select video data as one of the key frame or a key frame identifier representing the key frame based on whether the key frame is stored at the receiving device and a transmitter configured to communicate at least one of the video data and the inter-predicted frame.

Implementations can include one or more of the following features. For example, the inter-predicted frame can be one of a forward predicted frame or a bidirectionally predicted frame. The method can further include storing information associated with at least one key frame. The determining of whether the key frame is stored at the receiving device can include determining a video input includes the key frame identifier. The determining of whether the key frame is stored at the receiving device can include determining that the key frame is a graphical element of a user interface, and the key frame identifier is associated with the graphical element of the user interface. The determining whether the key frame is stored at the receiving device can include comparing at least one pixel color associated with the key frame and one of determining the key frame is stored at the receiving device is based on a color difference criterion or a mean square error calculation based on the comparing of the at least one pixel color. The determining of whether the key frame is stored at the receiving device can include generating a histogram based on the key frame and comparing the generated histogram to a stored histogram.

The determining of whether the key frame is stored at the receiving device can include generating a signature based on the key frame and comparing the generated signature to a stored signature. The determining of whether the key frame is stored at the receiving device can include generating at least one object classification and object position based on the key frame using a trained machine learning model, and comparing the at least one object classification and object position to a stored object classification and object position associated with a key frame stored at the receiving device. If the key frame is not stored at the receiving device, the method can further include generating the key frame identifier corresponding to the key frame and causing the key frame and the key frame identifier to be communicated to the receiving device.

The streaming device can receive a video stream including at least one frame and can further include an encoder configured to generate at least one of the key frame and the inter-predicted frame based on the at least one frame, the inter-predicted frame being generated using information from the key frame. The streaming device can further include a memory configured to store information associated with at least one key frame.

In a general aspect, a device, a system, a non-transitory computer-readable medium (having stored thereon computer executable program code which can be executed on a computer system), and/or a method can perform a process with a method including receiving a video stream including at least one of video data and an inter-predicted frame, the video data being at least one of a key frame and a key frame identifier representing the key frame, selecting one of the key frame or a stored key frame based on the video data, and generating a frame of video for display on a display of a play-back device based on at least one of the key frame, the stored key frame, and the inter-predicted frame.

In a general aspect a play-back device includes a receiver configured to receive a video stream including at least one of video data and an inter-predicted frame, the video data being at least one of a key frame and a key frame identifier representing the key frame, and a selection circuit configured to select one of the key frame or a stored key frame based on the video data.

In a general aspect play-back device includes a receiver configured to receive a video stream including at least one of video data and an inter-predicted frame, the video data being at least one of a key frame and a key frame identifier representing the key frame and a decoder including a selection circuit configured to select one of the key frame or a stored key frame based on the video data and a decompression module configured to generate a frame of video for display on a display of the play-back device based on at least one of the key frame, the stored key frame, and the inter-predicted frame.

Implementations can include one or more of the following features. For example, the method can further include selecting the stored key frame from a library including at least one stored key frame. The method can further include determining whether the video data includes the key frame and the key frame identifier and in response to determining the video data includes the key frame and the key frame identifier, store the key frame in relation to the key frame identifier in a key frame library. The method can further include determining whether the video data includes the key frame without the key frame identifier and in response to determining the video data includes the key frame without the key frame identifier, generate the key frame identifier, and store the key frame in relation to the key frame identifier in a key frame library.

The method can further include determining whether the video data includes the key frame identifier without the key frame and in response to determining the video data includes the key frame without the key frame identifier, read the key frame from a key frame library based on the key frame identifier. The method can further include determining whether the video data includes one of the key frame identifier or the key frame, in response to determining the video data includes the key frame identifier without the key frame, read the key frame from a key frame library based on the key frame identifier, and cause selection of the key frame read from the key frame library, and in response to determining the video data includes the key frame without the key frame identifier, cause selection of the key frame included in the video data.

The play-back device can further include a decoder configured to generate a frame of video for display on a display of the play-back device based on at least one of the key frame, the stored key frame, and the inter-predicted frame. The play-back device can further include a controller configured to cause the selection circuit to select one of the key frame or the stored key frame based on the video data and a library including at least one stored key frame.

In a general aspect, a device, a system, a non-transitory computer-readable medium (having stored thereon computer executable program code which can be executed on a computer system), and/or a method can perform a process with a method including generating at least one of a key frame and an inter-predicted frame based on a received video stream including at least one video frame, the inter-predicted frame being generated using information from the key frame, determining whether the key frame is stored at a receiving device, selecting video data as one of the key frame or a key frame identifier representing the key frame based on whether the key frame is stored at the receiving device, communicating at least one of the video data and the inter-predicted frame, receiving the video stream including the at least one of the video data and the inter-predicted frame, selecting one of the key frame or a stored key frame based on the video data, and generating a frame of video for display on a display of a play-back device based on at least one of the key frame, the stored key frame, and the inter-predicted frame.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A streaming device comprising:

a controller configured to compare pixels of a compressed key frame to pixels of a stored key frame in response to determining the compressed video frame is a key frame, the stored key frame being stored at a streaming device and at a receiving device, the stored key frame having an associated key frame identifier, and determine whether the key frame is stored at the receiving device based on the comparison;

a selector configured to:

in response to determining the compressed key frame is stored at a receiving device, select video data as the key frame identifier representing the key frame, in response to determining the compressed key frame is not stored at a receiving device, select the video data as the compressed key frame; and a transmitter configured to communicate the video data.

2. The streaming device of claim 1, further comprising:

receive a video stream including at least one frame; and an encoder configured to generate at least one of the key frame and an inter-predicted frame based on the at least one frame, the inter-predicted frame being generated using information from the key frame.

3. The streaming device of claim 2, wherein the inter-predicted frame is one of a forward predicted frame or a bidirectionally predicted frame.

4. The streaming device of claim 2, wherein determining whether the key frame is stored at the receiving device includes determining a video input to the encoder includes the key frame identifier.

5. The streaming device of claim 1, wherein determining whether the key frame is stored at the receiving device includes determining that the key frame is a graphical element of a user interface, and the key frame identifier is associated with the graphical element of the user interface.

6. The streaming device of claim 1, wherein determining whether the key frame is stored at the receiving device includes comparing at least one pixel color associated with the key frame and one of determining the key frame is stored at the receiving device is based on a color difference criterion or a mean square error calculation based on the comparing of the at least one pixel color.

7. The streaming device of claim 1, wherein determining whether the key frame is stored at the receiving device includes generating a histogram based on the key frame and comparing the generated histogram to a stored histogram.

8. The streaming device of claim 1, wherein determining whether the key frame is stored at the receiving device includes generating a signature based on the key frame and comparing the generated signature to a stored signature.

9. The streaming device of claim 1, wherein determining whether the key frame is stored at the receiving device includes generating at least one object classification and object position based on the key frame using a trained machine learning model, and comparing the at least one object classification and object position to a stored object classification and object position associated with a key frame stored at the receiving device.

10. The streaming device of claim 1, wherein if the key frame is not stored at the receiving device, the controller is further configured to generate the key frame identifier corresponding to the key frame and causing the key frame and the key frame identifier to be communicated to the receiving device.

11. An encoder comprising:

a compressed frame generator configured to generate at least one of a compressed key frame and an inter-predicted frame based on a received video stream including at least one frame, the inter-predicted frame being generated using information from the key frame;

a controller configured to determine whether the compressed key frame is stored at a receiving device based on a comparison of a first pixel at a location in the compressed key frame corresponding with a second pixel in a stored key frame;

a selection circuit configured to:

in response to determining the compressed key frame is stored at a receiving device, select video data as a key frame identifier representing the key frame in response to determining the key compressed frame is not stored at a receiving device, and select the video data as the compressed key frame; and a transmitter configured to communicate the video data or the inter-predicted frame.

12. The encoder of claim 11, wherein the inter-predicted frame is one of a forward predicted frame or a bidirectionally predicted frame.

13. The encoder of claim 11, wherein determining whether the key frame is stored at the receiving device includes determining a video input to the encoder includes the key frame identifier.

14. The encoder of claim 11, wherein determining whether the key frame is stored at the receiving device includes determining that the key frame is a graphical element of a user interface, and the key frame identifier is associated with the graphical element of the user interface.

15. The encoder of claim 11, wherein determining whether the key frame is stored at the receiving device comparing at least one pixel color associated with the key frame and one of determining the key frame is stored at the receiving device is based on a color difference criterion or a mean square error calculation based on the comparing of the at least one pixel color.

16. The encoder of claim 11, wherein determining whether the key frame is stored at the receiving device includes generating a histogram based on the key frame and comparing the generated histogram to a stored histogram.

17. The encoder of claim 11, wherein determining whether the key frame is stored at the receiving device includes generating a signature based on the key frame and comparing the generated signature to a stored signature.

18. The encoder of claim 11, wherein determining whether the key frame is stored at the receiving device includes generating at least one object classification and object position based on the key frame using a trained machine learning model, and comparing the at least one object classification and object position to a stored object classification and object position associated with a key frame stored at the receiving device.

19. The encoder of claim 11, wherein if the key frame is not stored at the receiving device, the controller is further configured to generate the key frame identifier corresponding to the key frame and causing the key frame and the key frame identifier to be communicated to the receiving device.

20. A method comprising:

generating at least one of a compressed key frame and an inter-predicted frame based on a received video stream including at least one video frame, the inter-predicted frame being generated using information from the key frame;

determining whether the compressed key frame is stored at a receiving device based on a comparison of a first pixel at a location in the key frame corresponding with a second pixel in a stored key frame;

in response to determining the compressed key frame is stored at a receiving device, selecting video data as a key frame identifier representing the key frame;

in response to determining the compressed key frame is not stored at the receiving device, and selecting the video data as the compressed key frame; and communicating at least one of the video data and the inter-predicted frame.

* * * * *